No. 638,625. Patented Dec. 5, 1899.
S. A. CHESLEY.
ROTARY METER.
(Application filed May 29, 1899.)
(No Model.)
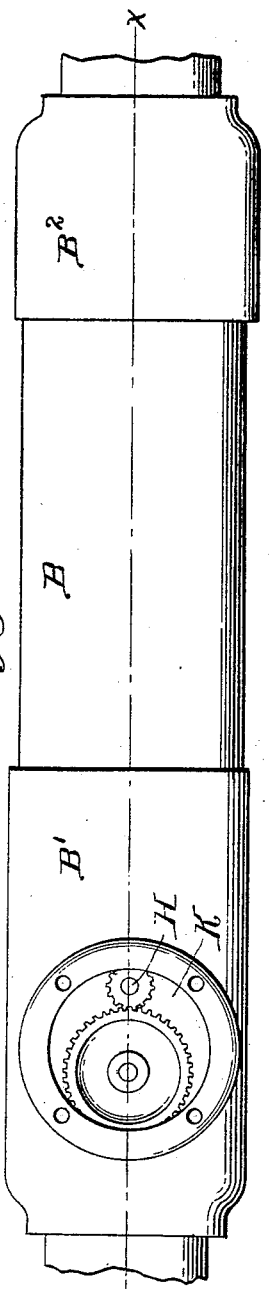
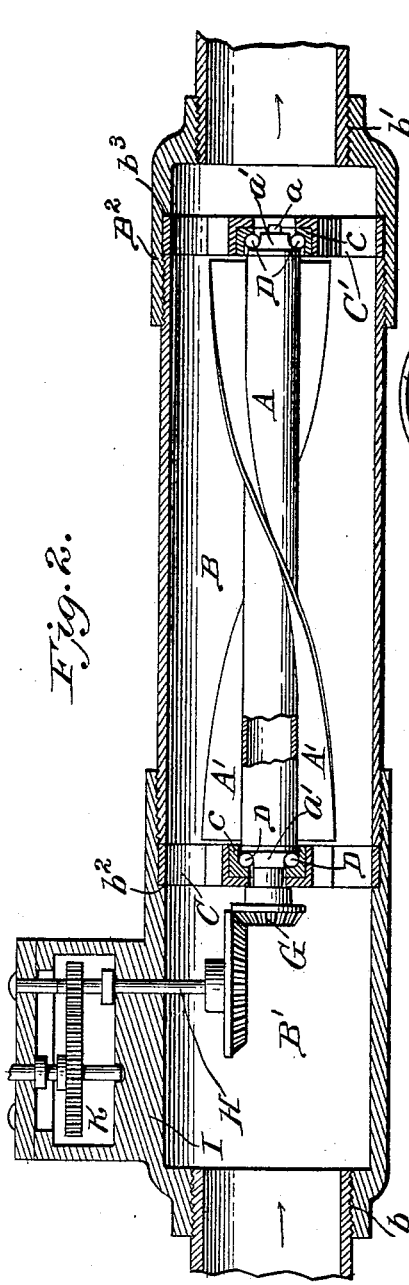
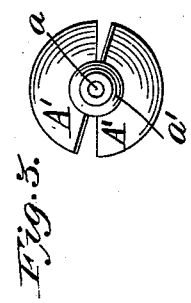
WITNESSES:
Edwin G. McKee.
G. M. Anderson
INVENTOR
S. A. Chesley
BY
E. W. Anderson
his ATTORNEY.

---

UNITED STATES PATENT OFFICE.

SAMUEL A. CHESLEY, OF LUNENBURG, CANADA.

ROTARY METER.

SPECIFICATION forming part of Letters Patent No. 638,625, dated December 5, 1899.

Application filed May 29, 1899. Serial No. 718,770. (No model.)

*To all whom it may concern:*

Be it known that I, SAMUEL A. CHESLEY, a citizen of the Dominion of Canada, and a resident of Lunenburg, in the county of Lunenburg and Province of Nova Scotia, Canada, have invented certain new and useful Improvements in Rotary Meters; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a plan view of the invention as in application, cap of chamber K being removed. Fig. 2 is a section on the line $xx$, Fig. 1, cap being in place. Fig. 3 is an end elevation of rotary part of meter. Fig. 4 is an end elevation of one of the spiders C'.

This invention is designed to provide a water-meter which will allow the free, practically straight, and unobstructed flow of water therethrough with no abstraction from the force of the current beyond the bare minimum amount necessary to actuate the registering clockwork, which is free from liability to become choked or clogged and in which the end thrust on the rotating shaft or spindle is reduced to a minimum. Other minor objects of the invention will hereinafter appear. I attain these objects by the means shown in the accompanying drawings, which I will now proceed to describe.

Referring to the said drawings, the letters A A' designate the rotary part of the meter, consisting of a spindle or shaft A, having thereon two opposite helical fins or flanges A' of long pitch. These fins or flanges have an angular relation with the shaft of about thirty degrees. The shaft A is journaled in a tubular casing composed of a main section B, an end section B', and a cap-section $B^2$, said sections being united by screw-joints. The contracted orifice $b$ in the end section B' is internally threaded for connection with a water-pipe, as shown, from which the water enters the meter, and the contracted orifice $b'$ in the cap-section $B^2$ is similarly threaded for connection with a water-pipe, as shown, which forms the outlet from the meter and leads to the point of consumption. The two openings $b\ b'$ are in axial alinement with the shaft or spindle A. C C' designate the bearings for the journals $a\ a$ of said shaft or spindle and consist each of a spider whose hub portion is formed with a cup $c$ to receive a series of balls D. The journals $a$ of the shaft or spindle A are provided with cones $a'$, which coöperate with the said cups and balls to provide ball-bearings for said shaft or spindle. The bearing-spider C is seated in the end section B' against an internal shoulder $b^2$ thereof and is held in place by the end of the section B, which is screwed down against it. The bearing-spider C' is seated in a similar manner against a shoulder $b^3$ in the cap-section $B^2$ and is held in place by the adjacent end of the section B, upon which said cap-section is screwed. The ball-bearings and caps are preferably made of glass or lignum-vitæ, but may be of some sufficiently-hardened non-corrosive metal.

The shaft A is preferably made hollow in order that it may be as light as possible, and it, together with the wings, may be of aluminium, which is both light and non-corrosive. I may, however, form the wings of any suitable non-corrosive material, either metallic or non-metallic. These flanges or fins, it will be observed, are of long pitch, each making throughout its length about or a little less than a one-half turn. They therefore present but little obstruction to the water, and the end thrust on the bearings is reduced to a minimum. Owing to these characteristics and the extreme freedom of rotation I am enabled to make the combined diameter of the shaft and flanges considerably less than the internal diameter of the tubular casing. It will also be observed that objects of considerable size can pass freely through the meter without interfering with its operation, and even eels of considerable size will not obstruct it. On the farther end of the shaft or spindle A is a bevel gear-wheel G, which meshes with a similar wheel on a vertical shaft H, at right angles to said shaft or spindle, and which passes through a wall or system I into a chamber K, (formed by a tubular projection of the section B',) where it actuates a dial-train of any suitable character. Said shaft H has a supporting-collar exterior to the casing.

Having thus described my invention, what I claim as new, and desire to secure by Letters Patent, is—

1. In a fluid-meter, the combination with a tubular casing having alined entrance and discharge openings, of a shaft or spindle journaled in said casing, and provided with two opposite helical fins or flanges, each of which has an angular relation with the axis of said shaft of about thirty degrees, and makes a turn of about one hundred and eighty degrees, and the combined diameter of which shaft and flanges is appreciably less than the internal diameter of the casing, substantially as specified.

2. In a water-meter, the casing composed of the tubular central section B, and the tubular end sections B', B², the internal shoulders of said end sections, the spiders clamped in place between said shoulders and the extremities of the central section, and the meter shaft or spindle journaled in hub portions of the said spiders, substantially as specified.

3. In a water-meter, the casing composed of the sections B, B', B², the sections B', B² having each an internal shoulder, the spiders seated in against said shoulders and held in place by the ends of the section B, the ball-cups in the hubs of said spiders and the meter-shaft having cones on its journals, together with antifriction-balls intermediate the cups and cones, substantially as specified.

In testimony whereof I affix my signature in presence of two witnesses.

SAMUEL A. CHESLEY.

Witnesses:
A. K. MACLEAN,
THOS. S. HOWE.